United States Patent
Brunel et al.

(10) Patent No.: US 8,102,816 B2
(45) Date of Patent: Jan. 24, 2012

(54) METHODS AND DEVICES FOR DETERMINING IF A HANDOVER HAS TO BE EXECUTED FOR A TERMINAL

(75) Inventors: Loic Brunel, Rennes Cedex (FR); Alain Mourad, Rennes Cedex (FR); David Mottier, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 438 days.

(21) Appl. No.: 12/364,750

(22) Filed: Feb. 3, 2009

(65) Prior Publication Data
US 2009/0209257 A1    Aug. 20, 2009

(30) Foreign Application Priority Data

Feb. 15, 2008   (EP) .................................... 08002822

(51) Int. Cl.
   *H04W 4/00*   (2009.01)
(52) U.S. Cl. ........................................................ 370/331
(58) Field of Classification Search .......... 370/310–350; 455/421–426.2, 436–444
   See application file for complete search history.

(56) References Cited

U.S. PATENT DOCUMENTS

| | | | |
|---|---|---|---|
| 5,711,003 A | | 1/1998 | Dupuy |
| 6,026,301 A | * | 2/2000 | Satarasinghe ................ 455/436 |
| 6,192,246 B1 | * | 2/2001 | Satarasinghe ................ 455/442 |
| 2004/0114673 A1 | * | 6/2004 | Panchal et al. ................ 375/148 |
| 2004/0128095 A1 | * | 7/2004 | Oestreich ........................ 702/89 |
| 2004/0266474 A1 | * | 12/2004 | Petrus ............................ 455/525 |
| 2005/0064879 A1 | * | 3/2005 | McAvoy .................... 455/456.1 |
| 2007/0019667 A1 | * | 1/2007 | Mottier et al. ................ 370/458 |
| 2007/0060126 A1 | * | 3/2007 | Taniguchi et al. ............ 455/436 |
| 2007/0115842 A1 | * | 5/2007 | Matsuda et al. .............. 370/252 |
| 2007/0160025 A1 | * | 7/2007 | Lee et al. ...................... 370/342 |
| 2007/0161374 A1 | * | 7/2007 | Kienstra et al. .............. 455/436 |
| 2009/0286488 A1 | * | 11/2009 | Singh et al. ..................... 455/73 |
| 2010/0061339 A1 | * | 3/2010 | Kim et al. ..................... 370/331 |
| 2010/0311440 A1 | * | 12/2010 | Rakanovic et al. ........ 455/456.1 |

FOREIGN PATENT DOCUMENTS

EP          1 746 743 A1     1/2007

OTHER PUBLICATIONS

"Digital Cellular Telecommunications System (Phase 2+); Radio Subsystem synchronization (3GPP TS 45.010)", 3GPP, Global System Mobile communications, XP 14032952, vol. 6.6.0, Nov. 2005, 27 Pages.
U.S. Appl. No. 12/364,835, filed Feb. 3, 2009, Brunel, et al.

* cited by examiner

*Primary Examiner* — Kwang B Yao
*Assistant Examiner* — Kenan Cehic
(74) *Attorney, Agent, or Firm* — Oblon, Spivak, McClelland, Maier & Neustadt, L.L.P.

(57) ABSTRACT

The present invention concerns a method for determining in a wireless cellular telecommunication network in which a half duplex terminal is handled by a first base station, if a second base station is able to handle the half-duplex terminal, characterized in that the method comprises the steps, executed by the half duplex terminal, of:
  receiving signals from the first base station and from the second base station,
  determining quality measurements for the signals,
  determining the time period between the reception of the signal transferred by the first base station and the reception of the signal transferred by the second base station,
  determining if the second base station is able to handle the half-duplex terminal according to at least the quality measurements and the time period.

11 Claims, 4 Drawing Sheets

METHODS AND DEVICES FOR DETERMINING IF A HANDOVER HAS TO BE EXECUTED FOR A TERMINAL

The present invention relates generally to a method and a device for determining, in a wireless cellular telecommunication network, if a handover has to be executed for a terminal.

In state of the art of wireless cellular telecommunication networks, each terminal is regularly assigned a candidate set of base stations, which could in theory handle the communication. These candidate base stations may be for instance base stations surrounding the base station which is currently handling the terminal. Each terminal regularly measures, or measures on demand, i.e. after a particular event, the quality of the signals in the candidate measurement channels of the different candidate base stations. These measurements are then reported by the terminal to the base station which is currently handling the terminal which may decide whether to start a handover procedure.

Alternatively, a candidate set of base stations is not assigned to the terminals. Each terminal performs measurements with the base stations from which it receives signals of the measurement channel with enough quality. Then, the terminal reports the measurements to the base station which is currently handling the terminal which may decide whether to start a handover procedure or to validate a handover procedure requested by the terminal.

Such a state-of-the-art handover is valid for full-duplex terminals but may lead to some issues for half duplex terminals.

A full-duplex terminal is a terminal which is able to transmit and receive radio signals simultaneously.

A half-duplex terminal is a terminal which is not able to transmit and receive radio signals simultaneously. For instance, the terminal operates in Time Division Duplex (TDD) mode, with transmission and reception on the same frequency band but at different time periods. The terminal may also operate in Frequency Division Duplex (FDD) mode, with transmission and reception on different frequency bands and at different time periods.

When a base station transmits symbols at time te to a half-duplex terminal, these symbols are received by the terminal located at a distance d from the base station at a time equal to te+RTD(d)/2, where RTD(d) is the Round Trip Delay for the terminal. These symbols are processed by the terminal which then may transmit also symbols over the uplink channel to the base station. Before transmitting symbols over the uplink channel, the terminal TE has to wait for a period of time, said Receive Transmit Switch time or simply switching time and referred to as RTS, in order to take into account the duration of hardware and software operations. For instance, this delay RTS is the maximum of the time needed by hardware equipments of the terminals to switch between reception and transmission modes and the time needed by hardware equipments of the base station to switch between transmission and reception modes. Thus, the symbols transmitted over the uplink channel cannot be received at the base station BTS before a time tr equal to te+RTD(d)+RTS+$D_{DL}$, $D_{DL}$ being the total duration of the symbols the terminal can receive in the downlink channel.

As example, if we consider a base station having a FDD cell radius of 10 km which is compatible with the Third Generation Partnership Project Long Term evolution (3GPP/LTE), an idle period duration which corresponds to two symbols duration needs to be created, either at both the base station and the terminal sides or only at the terminal sides in order to make the base station able to handle terminals located at any position in the cell. An idle period duration which corresponds to two symbols duration allows half-duplex terminals located at a distance from the base station up to 19.6 km to be handled by the base station.

An idle period duration which corresponds to one symbol duration allows only half-duplex terminals located at a distance from the base station up to 8.3 km to be handled by the base station. With such idle period duration, even if the quality of the signals of the measurement channel is sufficiently high, a half duplex terminal located at a distance larger than 8.3 km from the base station can not be handled by the base station whereas a full-duplex terminal could.

Thus, during communication, a handover procedure may be requested towards a base station whereas the half-duplex terminal can not be handled by the base station as the round trip delay between the base station and the terminal is not compatible with the idle period of the base station.

The present invention aims at avoiding that a handover is executed for a half-duplex terminal which can not cope with the idle period requirement of the target base station.

To that end, the present invention concerns a method for determining in a wireless cellular telecommunication network in which a half duplex terminal is handled by a first base station, if a second base station is able to handle the half-duplex terminal, characterized in that the method comprises the steps, executed by the half duplex terminal, of:
  receiving signals from the first base station and from the second base station,
  determining quality measurements for the signals,
  determining the time period between the reception of the signal transferred by the first base station and the reception of the signal transferred by the second base station,
  determining if the second base station is able to handle the half-duplex terminal according to at least the quality measurements and the time period.

The present invention concerns also a device for determining in a wireless cellular telecommunication network in which a half duplex terminal is handled by a first base station, if a second base station is able to handle the half-duplex terminal, characterized in that the device is included in the half duplex terminal and comprises:
  means for receiving signals from the first base station and from the second base station,
  means for determining quality measurements for the signals,
  means for determining the time period between the reception of the signal transferred by the first base station and the reception of the signal transferred by the second base station,
  means for determining if the second base station is able to handle the half-duplex terminal according to at least the quality measurements and the time period.

Thus, the quality of management of the handover procedure is increased by avoiding inefficient handover request for half-duplex terminals.

According to a particular feature, the wireless cellular telecommunication network is cell synchronized.

Thus, the validation of the handover is simplified.

According to a particular feature, the first base station transfers signals in a cell of the first base station, the half-duplex terminal, when being handled by the first base station, not transferring and not receiving signals during a period of time, called idle period of the cell of the first base station, and the determination if the second base station is able to handle the half-duplex terminal is further determined according to the idle period of the cell of the first base station.

Thus, the half-duplex terminal does not need a lot of messages from the first base station which handles the half-duplex terminal in order to determine if the second base station is able to handle the half-duplex terminal. Thus, the downlink signalling is not increased.

According to a particular feature, the second base station transfers signals in a cell of the second base station, the half-duplex terminal, when being handled by the second base station, not transferring and not receiving signals during a period of time, called idle period of the cell of the second base station, and the determination if the second base station is able to handle the half-duplex terminal is further determined according to the idle period of the cell of the second base station.

Thus, the half-duplex terminal can prevent handover without any need of specific deny message from the base station.

According to a particular feature, the wireless telecommunication network uses half duplex Frequency Division Duplexing scheme and only half-duplex terminals handled by the first or second base station do not transfer and do not receive signals during the idle period of the cell of the first or second base station or the half-duplex terminals handled by the first or second base station and the first or second base station do not transfer and do not receive signals during the idle period of the cell of the first or second base station.

Thus, the specific implementation costs at the base stations due to half-duplex FDD terminals are reduced or the power consumption of the base station is limited.

According to a particular feature, the wireless telecommunication network uses Time Division Duplexing scheme and the half-duplex terminals handled by the first or second base station and the first or second base station do not transfer and do not receive signals during the idle period.

Thus, the interference between uplink and downlink communication is reduced.

According to a particular feature, the half-duplex terminal:
  selects the base stations which transferred signals for which quality measurements are higher than a predetermined value and which are able to handle the half-duplex terminal,
  forms a measurement report which comprises the quality measurements on signals transferred by the selected base stations,
  transfers the measurement report to the first base station which handles the half-duplex terminal.

Thus, as the half-duplex terminal can check handover possibility towards each base station and transfers a measurement report which comprises only quality measurements on signals transferred by base station which can handle the terminal, the base station which handles the terminal can decide without any error which base station should handle the half-duplex terminal after handover.

According to a particular feature, the half-duplex terminal:
  receives from the first base station which handles the half-duplex terminal a message representative of a request to proceed to a handover to the second base station,
  checks if the second base station is able to handle the half-duplex terminal,
  transfers a message to the first base station which handles the half-duplex terminal according to the result of the check.

Thus, the base station can take decision of handover with low computational complexity.

According to still another aspect, the present invention concerns a computer program which can be directly loadable into a programmable device, comprising instructions or portions of code for implementing the steps of the method according to the invention, when said computer program is executed on a programmable device.

Since the features and advantages relating to the computer program are the same as those set out above related to the method and device according to the invention, they will not be repeated here.

The characteristics of the invention will emerge more clearly from a reading of the following description of an example embodiment, the said description being produced with reference to the accompanying drawings, among which:

The wireless cellular telecommunication network may use Time Division Duplexing scheme (TDD) or half duplex Frequency Division Duplexing scheme.

In TDD scheme, the signals transferred in uplink and downlink channels are duplexed in different sub frames, named also time slots, in the same frequency band.

In full duplex Frequency Division Duplexing scheme, the signals transferred in uplink and downlink channels are duplexed in same sub frames, named also time slots, in different frequency bands.

In half duplex FDD scheme, from the half-duplex terminal side, the signals transferred in uplink and downlink channels are duplexed in different sub frames, named also time slots, in different frequency bands. It should be noted that in such case, a base station may be able to use a full duplex Frequency Division Duplexing scheme whilst communicating with several half-duplex FDD terminals at the same time by appropriately ordering the time slots of each half-duplex FDD terminal.

When a base station BS transfers symbols to a terminal TE, the data, the signals or the messages are transferred through a downlink channel.

When a terminal TE transfers symbols to the base station BS, the signals, the messages or data are transferred through uplink channel.

Figure 1:
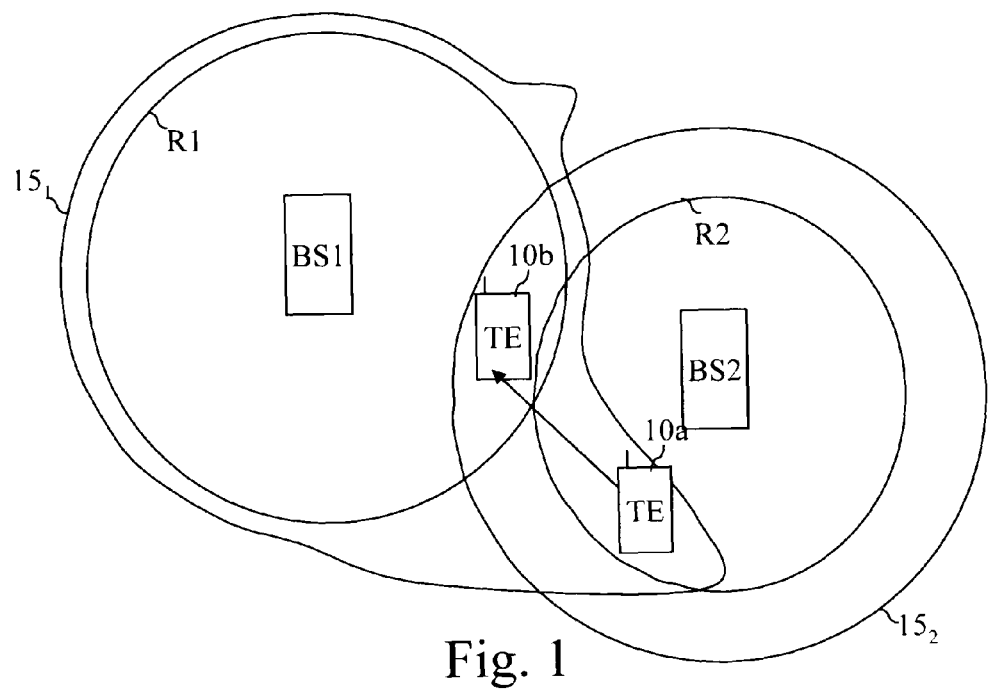
FIG. 1 is a diagram representing the architecture of the wireless cellular telecommunication network in which the present invention is implemented.

In the wireless cellular telecommunication network of the FIG. 1, a terminal TE located in the cell $15_2$ of a base station BS2 is moving to the cell $15_1$ of the base station BS1.

Only two base stations BS are shown in the FIG. 1 for the sake of simplicity but in practice, the wireless cellular telecommunication network is composed of plural base stations BS.

The cell $15_1$ of the base station BS1 is the area in which the power strength of the signals transferred by the base station BS1, like the one transferred in the measurement channel of the base station BS1, are received by a terminal TE located in the cell $15_1$ at a level which is upper than a predetermined value.

When a full-duplex terminal TE is located in the cell $15_1$ of the base station BS1, the base station BS1 can handle the full-duplex terminal TE. The full-duplex terminal TE can establish or receive a communication with a remote telecommunication device through the base station BS1. The cell $15_1$ has not a regular shape. This is mainly due to the particular locations which are in line of sight with the base station BS1 or obstructions.

The area R1 of the base station BS1 is the area in which, for each terminal TE located in R1, the sum of the round trip delay between the base station BS1 and the terminal TE and the switch between receive and transmit modes and/or the switch between transmit and receive modes is lower than or equal to the idle period of the cell $15_1$.

In other words, when a half-duplex or full-duplex terminal TE is located in the area R1 of the base station BS1, the terminal TE can be handled by the base station BS1 and can establish or receive a communication with a remote telecommunication device through the base station BS1.

When a half-duplex terminal TE is located in the cell $15_1$ and is not located in area R1 of the base station BS1, the half-duplex terminal TE can not be handled by the base station BS1 as the terminal TE has a characteristic in the cell $15_1$ which is not compatible with the idle period of the cell $15_1$.

The area R1 is included in the cell $15_1$. The difference between R1 and $15_1$ is defined by the idle period set for the cell $15_1$.

A large idle period will enable any half-duplex terminal TE to be handled by the base station BS1 but will reduce the overall capacity in term of data transferred between the base station R1 and the half-duplex terminals TE. R1 is defined so as to provide to a majority of half duplex terminals TE located in the cell $15_1$, the possibility to be handled by the base station BS1. R1 is defined so as to avoid that the idle period has to be lengthened only for a minority of half-duplex terminals TE which are far from the base station BS1.

The cell $15_2$ of the base station BS2 is the area in which the power strength of the signals, like the one transferred in the measurement channel of the base station BS2, is received by a terminal TE located in the cell $15_2$ at a level which is upper than a predetermined value. When a full-duplex terminal TE is located in the cell $15_2$ of the base station BS2, the base station BS2 can handle the full-duplex terminal TE. The full-duplex terminal TE can establish or receive a communication with a remote telecommunication device through the base station BS2.

The area R2 of the base station BS2 is the area in which, for each terminal TE located in R2, the sum of the round trip delay between the base station BS2 and the terminal TE and the switch between receive and transmit modes and/or the switch between transmit and receive modes is lower than or equal to the idle period of the cell $15_2$.

In other words, when a half-duplex or full-duplex terminal TE is located in the area R2 of the base station BS2, the terminal TE can be handled by the base station BS2 and can establish or receive a communication with a remote telecommunication device through the base station BS2.

When a half-duplex terminal TE is located in the cell $15_2$ and is not located in area R2 of the base station BS2, the half-duplex terminal TE can not be handled by the base station BS2 as the terminal TE has a characteristic in the cell $15_2$ which is not compatible with the idle period of the cell $15_2$.

The area R2 is comprised in the cell $15_2$. The difference between R2 and $15_2$ is defined by the idle period set for the cell $15_2$.

It has to be noted here that the idle period set respectively for the cells $15_1$ and $15_2$ may be equal or different.

The base stations BS comprise means for transferring downlink signals messages to the terminal TE and means for receiving messages according to the present invention.

The base stations BS are also named nodes or nodes B or enhanced nodes B or access points.

The terminal TE is a half-duplex terminal like a mobile phone, a personal digital assistant, or a personal computer. The terminal TE is also named a user equipment.

The wireless telecommunication network is cell-synchronised. The signals originated from different cells 15 or base stations BS are simultaneously transmitted.

More precisely, the signals are structured in frames, which are themselves composed of symbols. Cell synchronisation may be ensured at the symbol level meaning that the transmission time of a symbol at a given cell 15 or base station BS matches the transmission time of a symbol at any other cell 15 or base station BS. Cell synchronisation may also be ensured at the frame level. In that case, the transmission time of a frame at a given cell 15 or base station BS matches the transmission time of a frame at any other cell 15 or base station BS. Cell synchronisation can be carried out by including a GNSS (Global Navigation Satellite System) in each base station BS.

Figure 2A:
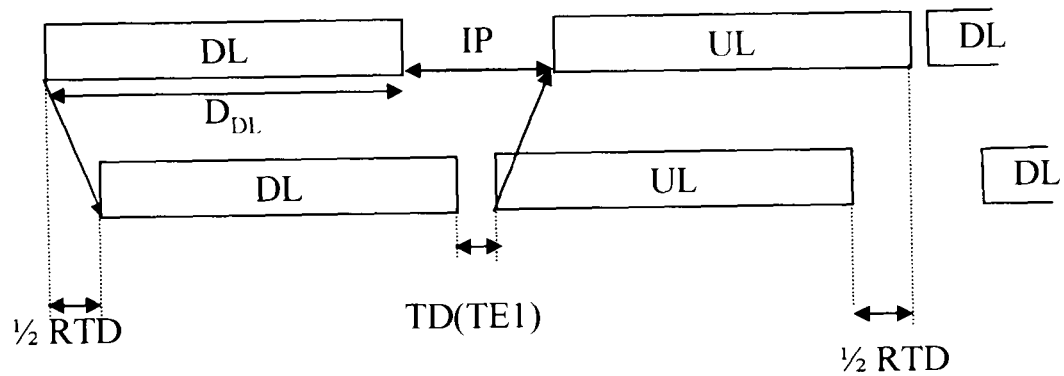
FIG. 2a is a chronogram depicting the idle period when the uplink channel is synchronous and where the base station and the half-duplex terminal don't transfer and receive signal in the idle period of the cell.

FIG. 2a is a chronogram depicting the idle period when the uplink channel is synchronous and where the base station and the half-duplex terminal don't transfer and receive signal in the idle period of the cell.

When the uplink channel is synchronous, the symbols transmitted in the uplink channel of a given cell 15 of a base station BS have to be received at the same time tr by the base station BS, regardless of the distance separating the base station BS and the terminal TE. When no signal is received or transferred during the idle period by both the base station and the half-duplex terminal side, the base station BS has to wait for the reception of the symbols transmitted by the terminal TE in order to perform the processing thereof.

The waiting time determined for the terminal TE which is located at the border of the area R1 or R2 or in other words, the largest waiting time that can be determined, is called the Guard Period or idle period IP of the cell 15 and must be equal at least to the round trip delay RTD(Ra) plus the Receive Transmit Switch times RTS, where Ra is the radius of the area R1 or R2 if the area R1 or R2 is considered as a circle.

The base station BS1 transfers downlink symbols DL to the terminal TE. These downlink symbols DL are received by the terminal TE at a delay equal to half of the round trip delay RTD.

During the idle period IP, the base station BS doesn't transfer or receive any symbol. By not transferring or receiving any symbol, power consumption of the base station is reduced.

As the uplink symbols need to be received by the base station BS at the same time regardless of the distance separating the base station BS and each terminal TE comprised in its cell $15_1$ the base station BS determines a timing delay TD(d) for each of the terminals TE.

The timing delay is calculated using the following formula: $TD(d)=tr-te-D_{DL}-RTD(d)=IP-RTD(d)$, where d is the distance between the terminal TE and the base station BS and $D_{DL}$ being the total duration of the symbols the terminal can receive in the downlink channel.

From each timing delay, the base station BS determines the Timing Advance $TA=IP-TD(d)$ for each terminal TE and transfers the Timing Advance to the corresponding terminal TE.

In case the terminal TE1 is scheduled in the uplink timeslot just following a preceding downlink timeslot comprising data for the terminal TE, the terminal TE applies its Timing Advance TA(TE) value for the transmission of symbols over the uplink channel in such a manner that the transmitted symbols are received at the base station BS from the terminal TE at the beginning of the uplink timeslot tr.

It has to be noted here that the idle period IP is discontinuous. It is composed for the terminal TE of the two time periods noted ½ RTD and the time period TD(TE).

Figure 2B:
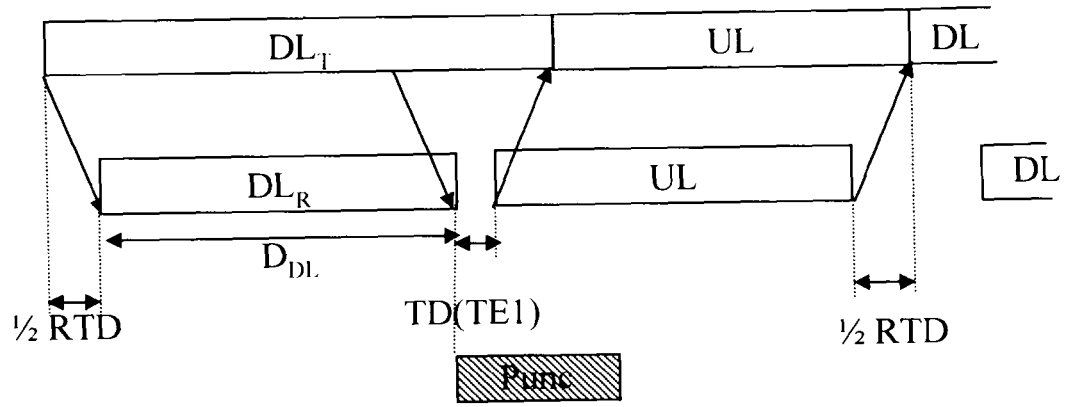
FIG. 2b is a chronogram depicting the idle period when the uplink channel is synchronous and where the half-duplex terminal does not transfer and receive signal in the idle period of the cell.

FIG. 2b is a chronogram depicting the idle period when the uplink channel is synchronous and where the half-duplex terminal does not transfer and receive signals in the idle period of the cell.

During the idle period in the example of the FIG. 2b, only the terminal TE does not receive or transfer signals.

The base station BS transfers symbols in the downlink channel $DL_T$ without any consideration of an idle period. The base station BS considers each terminal TE as being potentially a full-duplex terminal TE. The base station BS may transfer symbols even if they are not usable by the half-duplex terminals. Transferring non-usable symbols reduces development cost for manufacturing specific features of base stations BS which are able to handle full and half-duplex terminals TE.

When a half-duplex terminal TE, as example the terminal TE, receives the symbols in the downlink channel $DL_T$, the terminal TE executes some puncturing on the received symbols. The terminal TE receives only the downlink symbols in $DL_R$ which are compatible with the idle period of the cell 15, i.e. the downlink symbols which are comprised in the duration $D_{DL}$ of the symbols the terminal can receive in the downlink channel.

The timing advance TA(TE) and the timing delay TD(TE) for the terminal TE are determined in a similar way as it has been disclosed in the FIG. 2a.

It has to be noted here that the idle period IP is continuous at the base station BS whereas it is discontinuous at the half-duplex terminal TE. It is composed for the terminal TE of the two time periods noted ½ RTD and the time period TD(TE).

Those signals Punc which are not comprised in $D_{DL}$ are not processed.

Figure 3:
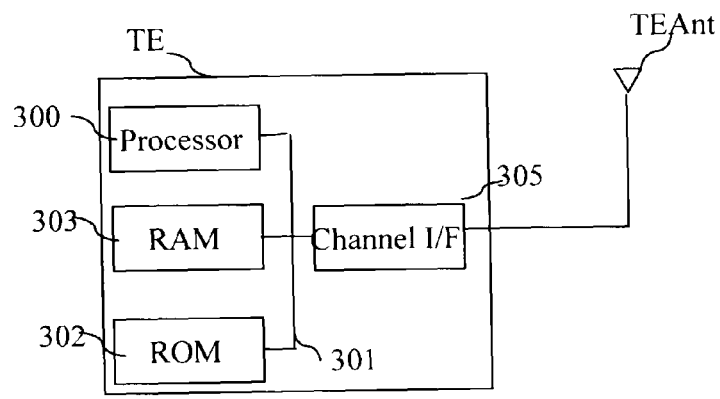
FIG. 3 is a diagram representing the architecture of a terminal of the wireless telecommunication system according to the present invention.

FIG. 3 is a diagram representing the architecture of a terminal according to the present invention.

Figure 5:
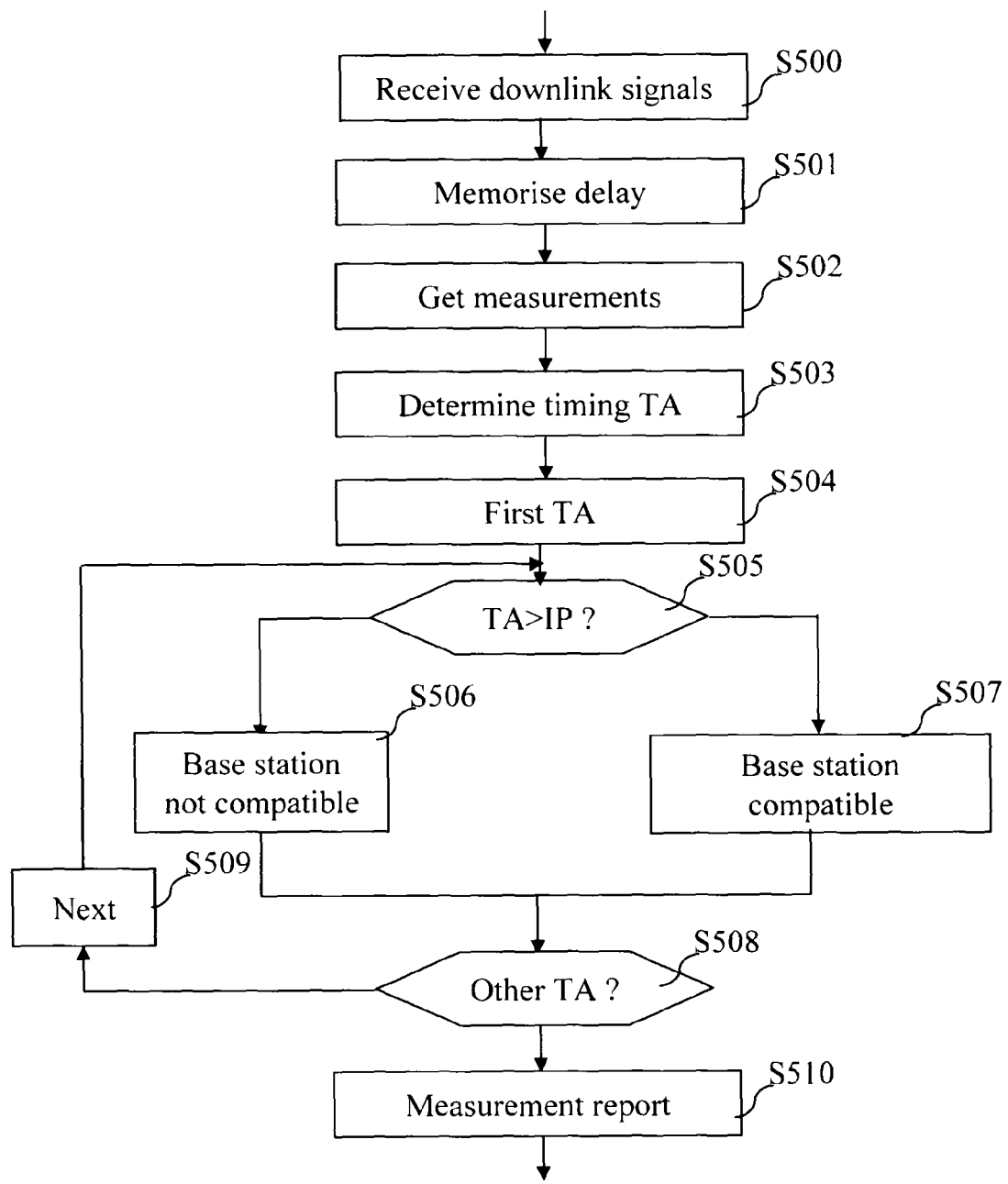
FIG. 5 depicts an example of a chronogram of signals and timings according to the present invention.
Figure 6:
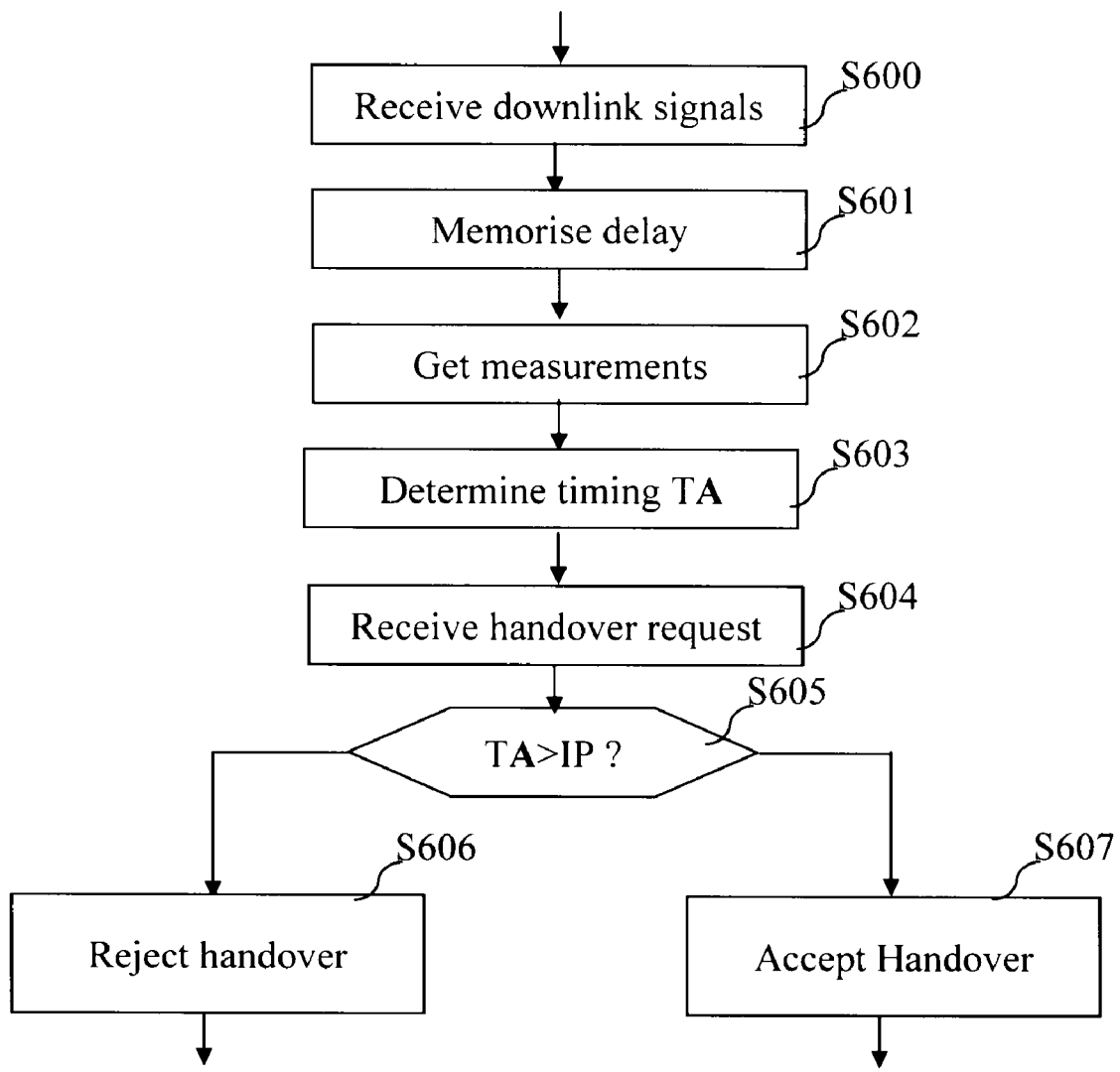
FIG. 6 is an example of algorithm executed by a terminal according to a first mode of realisation of the present invention.

The terminal TE, has, for example, an architecture based on components connected together by a bus 301 and a processor 300 controlled by programs related to the algorithms as disclosed in the FIG. 5 or 6.

It has to be noted here that the terminal TE is, in a variant, implemented under the form of one or several dedicated integrated circuits which execute the same operations as the one executed by the processor 300 as disclosed hereinafter.

The bus 301 links the processor 300 to a read only memory ROM 302, a random access memory RAM 303 and a channel interface 305.

The read only memory ROM 302 contains instructions of the programs related to the algorithms as disclosed in the FIG. 5 or 6 which are transferred, when the terminal TE is powered on to the random access memory RAM 303.

The RAM memory 303 contains registers intended to receive variables, and the instructions of the programs related to the algorithms as disclosed in the FIG. 5 or 6.

The channel interface 305 comprises means for transferring and/or receiving messages to and/or from the base stations BS, means for transferring reports messages according to the present invention through the antenna TEAnt and means for measuring the quality of received signals.

Figure 4:
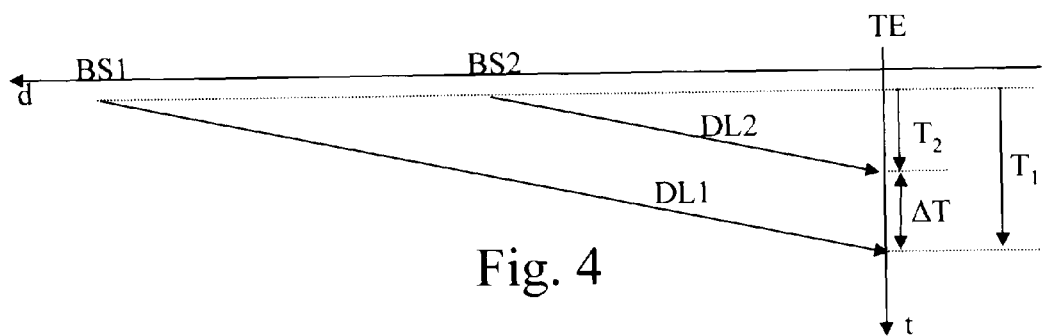
FIG. 4 is a chronogram depicting the idle period when the uplink channel is asynchronous, the wireless telecommunication network uses Time Division Duplexing scheme and the half-duplex terminal located in the cell and the base station do not transfer and do not receive signals during the idle period.

FIG. 4 depicts an example of a chronogram of signals and timings according to the present invention.

The horizontal axis represents the distance separating the base stations BS and the terminal TE and the vertical axis represents the time.

The base station BS2 transfers signals DL2 which are received by the terminal TE after a time duration of $T_2$.

The base station BS1 transfers signals DL1 which are received by the terminal TE after a time duration of $T_1$.

The difference of the time of reception of the signals DL1 and DL2 is noted ΔT.

According to the invention, the terminal TE will use efficiently the difference ΔT in order to adapt the quality measurements report of the signals received by the terminal TE as it will be disclosed hereinafter.

FIG. 5 is an example of algorithm executed by a terminal according to a first mode of realisation of the present invention.

More precisely, the present algorithm is executed by the processor 300 of each terminal TE each time downlink signals are received, e.g. in the measurement channel, from at least one base station BS.

The terminal TE knows the idle period IP of the cell 15 of the base station BS which is currently handling the terminal TE, named also first base station BS, and the idle period IP of the cells 15 of other base stations BS, named also second base stations BS, which are, as example, neighbours of the base station BS which is currently handling the terminal TE.

The idle period IP of each cell 15 of base station BS is broadcasted by the base station BS which is currently handling the terminal TE or is broadcasted by each base station BS or is identical for each cell 15 of base station BS.

At step S500, the processor 300 detects the reception by the channel interface 305 of a signal in the measurement channel of the base station BS which handles the terminal TE or first base station BS and at least a signal transferred by at least another or second base station BS in its measurement channel.

At next step S501, the processor 300, for each other base station BS than the base station BS which is currently handling the terminal TE, memorises the difference of time ΔT between the time of reception of the signal transferred by the base station BS which handles the terminal TE and the time of reception of the signal transferred by the other base station BS.

At next step S502, the processor 300 commands the channel interface 305 to execute some quality measurements on downlink signals. The channel interface 305 measures the signals transferred in each measurement channel of base station BS it can find and memorises the base stations BS and the measurements for which the quality measurements are higher than a predetermined value.

At next step S503, the processor 300 determines, for each other base station BS, the Timing Advance it will have to apply if the terminal TE was handled by the other base station BS.

The processor 300 determines the Timing Advance according to the following formula:

$$TA(\text{other } BS) = IP(BS) - TA(BS) + 2 \Delta T$$

TA(other BS) is the Timing Advance to be determined for the other base station BS, TA(BS) is the Timing Advance for the base station BS which currently handles the terminal TE and IP(BS) is the idle period of the cell 15 of the base station BS which currently handles the terminal TE.

At next step S504, the processor 300 selects a first determined Timing Advance TA.

At next step S505, the processor 300 checks if the selected Timing Advance TA is larger than IP(other BS).

IP(other BS) is the idle period of the cell 15 of the other base station BS.

When a determined Timing Advance is larger than IP(other BS) for another base station BS, it means that the round trip delay between the terminal TE and the other base station BS is upper than the idle period of the cell 15 of the other base station BS and that the terminal TE can not be handled by the other base station BS.

If the selected Timing Advance is larger than IP(other BS), the processor 300 moves to step S506. If the selected Timing Advance is lower than or equal to IP(other BS), the processor 300 moves to step S507.

At step S506, the processor 300 marks the other base station BS for which the Timing Advance is selected as not compatible with the terminal TE and moves to step S508.

At step S507, the processor 300 marks the other base station BS for which the Timing Advance is selected as compatible with the terminal TE and moves to step S508.

At step S508, the processor 300 checks if a determined Timing Advance has not been selected. If a Timing Advance has not been selected, the processor 300 moves to step S509, selects another Timing Advance and returns to step S505.

If each determined Timing Advance has been selected, the processor 300 moves to step S510 and forms a measurement report.

The processor 300 selects the base stations which transferred signals on which quality measurements are higher than a predetermined value and which are able to handle the half-duplex terminal. The processor 300 forms a measurement report which comprises the quality measurements on signals transferred by the selected base stations.

After that, the processor 300 commands the transfer of the measurement report to the base station BS which handles the terminal TE.

FIG. 6 is an example of algorithm executed by a terminal according to a second mode of realisation of the present invention.

More precisely, the present algorithm is executed by the processor 300 of each terminal TE each time downlink signals are received in measurement channel of at least one base station BS.

The terminal TE knows the idle period IP of the cell 15 of the base station BS which is currently handling the terminal TE, named also first base station BS, and the idle period IP of the cells 15 of the other base stations BS, named also second base stations BS, which are, as example, neighbours of the base station BS which is currently handling the terminal TE.

The idle period IP of each cell of base station BS is broadcasted by the base station BS which is currently handling the terminal TE or broadcasted by each base station BS or is identical for each cell 15 of base station BS.

At step S600, the processor 300 detects the reception by the channel interface 305 of a signal in the measurement channel of the base station BS which handles the terminal TE and at least signal transferred by at least another base station BS in its measurement channel.

At next step S601, the processor 300, for each other base station BS than the base station BS which is currently handling the terminal TE, memorises the difference of time ΔT between the time of reception of the signal transferred by the base station BS which handles the terminal TE and the time of reception of the signal transferred by the other base station BS.

At next step S602, the processor 300 commands the channel interface 305 to execute some quality measurements on downlink signals. The channel interface 305 measures the signals transferred in each measurement channel of base station BS it can find and memorises the base stations BS and the measurements for which the quality measurements are higher than a predetermined value.

At next step S603, the processor 300 determines, for each other base station BS, the Timing Advance it will have to apply if the terminal TE was handled by the other base station BS.

The processor 300 determines the Timing Advance according to the following formula:

$$TA(\text{other } BS) = IP(BS) - TA(BS) + 2 \Delta T$$

TA(other BS) is the Timing Advance to be determined for the other base station BS, TA(BS) is the Timing Advance for the base station BS which currently handles the terminal TE and IP(BS) is the idle period of the cell 15 of the base station BS which currently handles the terminal TE.

At step S604, the processor 300 receives through the channel interface 305, a message transferred by the base station BS which handles the terminal TE and which is representative of a request to proceed to a handover, i.e. to be handled by another base station BS.

At next step S605, the processor 300 checks if the Timing Advance determined for the other base station BS is larger than IP(other BS).

IP(other BS) is the idle period of the cell 15 of the other base station BS.

If the Timing Advance determined for the other base station BS is larger than IP(other BS), the processor 300 moves to step S606. Otherwise, the processor 300 moves to step S607.

At step S606, the processor 300 commands the transfer of a message to the base station BS which handles the terminal TE which is representative of a reject of the handover. After that, the processor 300 interrupts the present algorithm.

At step S607, the processor 300 commands the transfer of a message to the base station BS which handles the terminal TE which is representative of an agreement to proceed to the handover. The processor 300 starts a classical handover procedure with the other base station BS.

Naturally, many modifications can be made to the embodiments of the invention described above without departing from the scope of the present invention.

The invention claimed is:

1. A method for determining in a wireless cellular telecommunication network in which a half duplex terminal is handled by a first base station, if a second base station is able to handle the half-duplex terminal, the method comprising steps, executed by the half duplex terminal, of:
   receiving signals from the first base station and from the second base station;
   determining quality measurements for the received signals;

determining a time difference between the reception of the signal transferred by the first base station and the reception of the signal transferred by the second base station; and determining a time advance transmission timing, using the determined time difference, of transmitting an uplink signal from the terminal to the second base station on an uplink channel, the uplink signal received at the second base station at a predetermined timing upon transmission of the uplink signal at the time advance transmission timing, the second base station not being able to handle the half-duplex terminal upon determination that the time advance transmission timing is greater than an idle period of a cell of the second base station in which the half-duplex terminal is not transferring or receiving signals from the second base station.

2. The method according to claim 1, wherein the wireless cellular telecommunication network is cell synchronized.

3. The method according to claim 2, wherein
the first base station transfers signals in a cell of the first base station,
the half-duplex terminal, when being handled by the first base station, not transferring and not receiving signals during an idle period of the cell of the first base station, and
the time advance transmission timing is further determined using the idle period of the cell of the first base station.

4. The method according to claim 3, wherein
the second base station transfers signals in a cell of the second base station where other terminals are located,
the half-duplex terminal, when being handled by the second base station, not transferring and not receiving signals during an idle period of the cell of the second base station, and
the time advance transmission timing is further determined using the idle period of the cell of the second base station.

5. The method according to any of the claims 1 to 4, wherein
the wireless telecommunication network uses half duplex Frequency Division Duplexing scheme, and
only half-duplex terminals handled by the first or second base station do not transfer and do not receive signals during the idle period of the cell of the first or second base station or the half-duplex terminals handled by the first or second base station and the first or second base station do not transfer and do not receive signals during the idle period of the cell of the first or second base station.

6. The method according to any of the claims 1 to 4, wherein the wireless telecommunication network uses Time Division Duplexing scheme, and
the half-duplex terminals handled by the first or second base station and the first or second base station do not transfer and do not receive signals during the idle period.

7. The method according to any of the claims 1 to 4, wherein the method further comprises steps of:
selecting the base stations which transferred signals for which quality measurements are higher than a predetermined value and which are able to handle the half-duplex terminal,
forming a measurement report which comprises the quality measurements on signals transferred by the selected base stations,
transferring the measurement report to the first base station which handles the half-duplex terminal.

8. The method according to any of the claims 1 to 4, wherein the method further comprises steps of:
receiving from the first base station which handles the half-duplex terminal a message representative of a request to proceed to a handover to the second base station,
checking if the second base station is able to handle the half-duplex terminal,
transferring a message to the first base station which handles the half-duplex terminal according to the result of the check.

9. A device for determining in a wireless cellular telecommunication network in which a half duplex terminal is handled by a first base station, if a second base station is able to handle the half-duplex terminal, the device included in the half duplex terminal, the device comprising:
means for receiving signals from the first base station and from the second base station,
means for determining quality measurements for the received signals,
means for determining a time difference between the reception of the signal transferred by the first base station and the reception of the signal transferred by the second base station;
means for determining a time advance transmission timing, using the determined time difference, of transmitting an uplink signal from the terminal to the second base station on an uplink channel, the uplink signal received at the second base station at a predetermined timing upon transmission of the uplink signal at the time advance transmission timing,
the second base station not being able to handle the half-duplex terminal upon determination that the time advance transmission timing is greater than an idle period of a cell of the second base station in which the half-duplex terminal is not transferring or receiving signals from the second base station.

10. A non-transitory computer readable medium having instructions stored therein, which when executed by a processor in a half-duplex terminal causes the processor to execute steps of the method according to claims 1 to 4.

11. A method for determining in a cell synchronized wireless cellular telecommunication network in which a half duplex terminal is handled by a first base station, if a second base station is able to handle the half-duplex terminal, the method comprising steps, executed by the half duplex terminal, of:
receiving signals from the first base station and from the second base station;
determining quality measurements for the received signals;
determining a time difference between the reception of the signal transferred by the first base station and the reception of the signal transferred by the second base station; and
determining if the second base station is able to handle the half-duplex terminal according to at least the quality measurements and the time difference, wherein
the first base station transfers signals in a cell of the first base station,
the second base station transfers signals in a cell of the second base station where other terminals are located,
the half-duplex terminal, when being handled by the first base station, not transferring and not receiving signals during an idle period of the cell of the first base station, the half-duplex terminal, when being handled by the second base station, not transferring and not receiving signals during a period of time, called an idle period of the cell of the second base station, and the determination if the second base station is able to handle the half-duplex terminal is further determined according to the idle period of the cell of the first base station, and the idle period of the cell of the second base station.

* * * * *